(12) United States Patent
Hill et al.

(10) Patent No.: US 12,073,119 B2
(45) Date of Patent: Aug. 27, 2024

(54) DUAL STORE QUEUE

(71) Applicant: QUALCOMM Incorporated, San Diego, CA (US)

(72) Inventors: Cerine Marguerite Hill, Cary, NC (US); Derek Robert Hower, Durham, NC (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/821,065

(22) Filed: Aug. 19, 2022

(65) Prior Publication Data

US 2024/0061612 A1 Feb. 22, 2024

(51) Int. Cl.
*G06F 3/06* (2006.01)

(52) U.S. Cl.
CPC .......... *G06F 3/0659* (2013.01); *G06F 3/0614* (2013.01); *G06F 3/0671* (2013.01)

(58) Field of Classification Search
CPC .... G06F 3/0659; G06F 3/0614; G06F 3/0671; G06F 9/3856
See application file for complete search history.

(56) References Cited

U.S. PATENT DOCUMENTS

| | | | | |
|---|---|---|---|---|
| 7,587,556 B2 * | 9/2009 | Piry | ...................... | G06F 9/3834 711/128 |
| 9,400,752 B1 * | 7/2016 | Alexander | .......... | G06F 12/0833 |
| 2002/0112130 A1 | 8/2002 | Arimilli et al. | | |
| 2005/0251660 A1 | 11/2005 | Bell, Jr. et al. | | |
| 2009/0037697 A1 | 2/2009 | Ramani et al. | | |
| 2015/0378905 A1 | 12/2015 | Bradbury et al. | | |
| 2017/0161070 A1 | 6/2017 | Busaba et al. | | |
| 2019/0138448 A1 * | 5/2019 | Li | ...................... | G06F 12/0868 |
| 2022/0027468 A1 | 1/2022 | Favor | | |

OTHER PUBLICATIONS

International Search Report and Written Opinion—PCT/US2023/070828—ISA/EPO—Nov. 9, 2023.
De Schepper K., et al., "DualQ Coupled AQM for Low Latency, Low Loss and Scalable Throughput draft-briscoe-tsvwg-aqm-dualq-coupled-00", Active Queue Management (aqm), Oct. 31, 2016, 450 pages.

* cited by examiner

*Primary Examiner* — Idriss N Alrobaye
*Assistant Examiner* — Richard B Franklin
(74) *Attorney, Agent, or Firm* — QUALCOMM Incorporated

(57) ABSTRACT

Disclosed are techniques for processing uncommitted writes in a store queue. In an aspect, an apparatus comprises a processor and a dual store queue having an in-order queue (IOQ) for storing uncommitted writes and an uncommitted data gather queue (UGQ) for gathering uncommitted data. The dual store queue receives, from a processor, a first write instruction for writing first data to at least a portion of memory at a first memory address, allocates an IOQ entry corresponding to the first write instruction, and allocates or updates a UGQ entry associated with the first memory address to contain the first data.

22 Claims, 9 Drawing Sheets

| Idx | Address | Valid Bytes | Data |
|---|---|---|---|
| 0 | x | 00000000 | ---------------- |
| 1 | A | 11111111 | 0807060504030201 |
| 2 | B | 00001111 | --------3A3B3C3D |
| 3 | A | 11110000 | 090A0B0C-------- |
| 4 | C | 00000001 | --------------2A |
| 5 | A | 00000011 | ------------0D0E |
| 6 | A | 01000000 | --0F------------ |
| 7 | B | 00110000 | ----3E3D-------- |
| ... | ... | ... | ... |
| 31 | x | 00000000 | ---------------- |

110

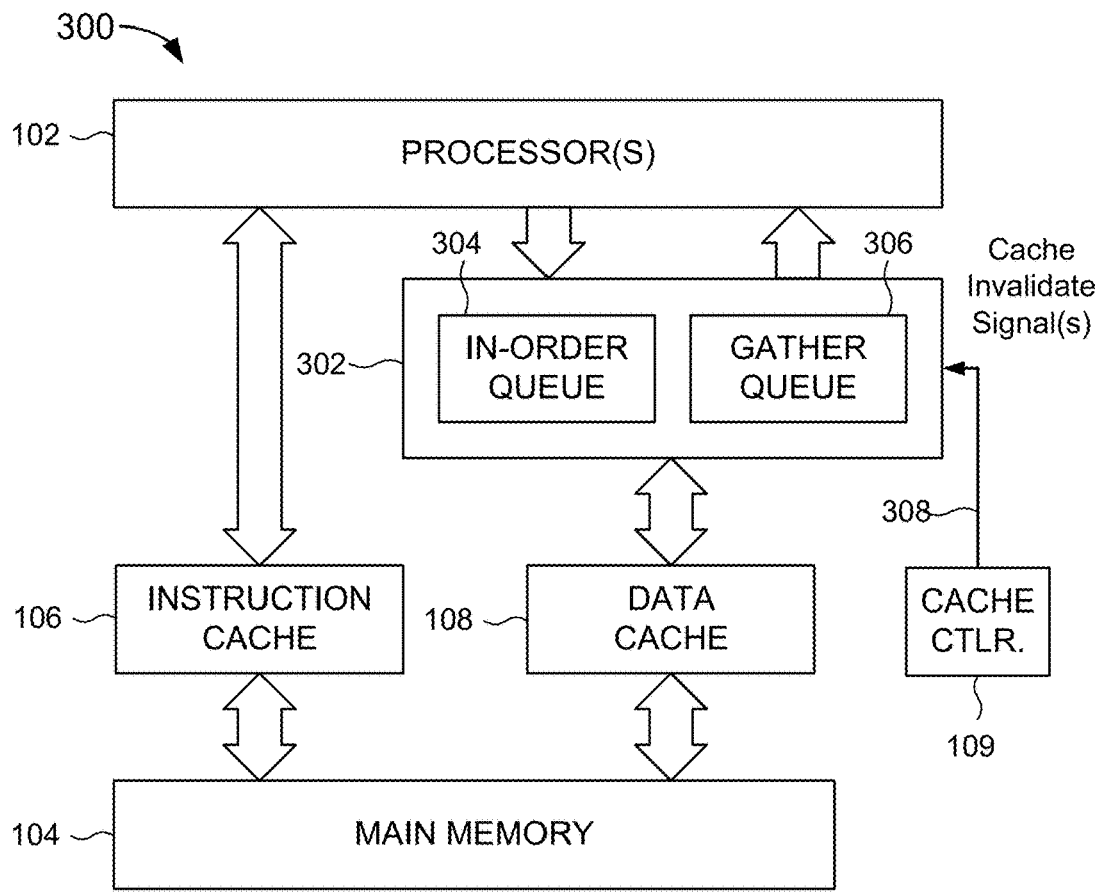

FIG. 3

| Field Name | # of Bits |
|---|---|
| Byte Valid | 8 |
| Byte Is Youngest | 8 |
| Gather Queue Index | 5 |
| Physical Page Number | 22 |
| Page Offset | 12 |
| Instruction Identifier | 8 |
| Reorder Buffer Index | 5 |
| Address Is Virtual | 1 |
| Address Is Cacheable | 1 |
| Address Is I/O | 1 |
| Virtual Page Number | 36 |
| Address Space Identifier | 16 |
| Memory-Aligned Data | 64 |

| Field Name | # of Bits |
|---|---|
| Byte Valid | 8 |
| Byte Pending | 8 |
| Physical Page Number | 22 |
| Virtual Address | 45 |
| Address Space Identifier | 16 |
| Memory-Aligned Data | 64 |

FIG. 4

DUAL STORE QUEUE

BACKGROUND OF THE DISCLOSURE

1. Field of the Disclosure

Disclosed embodiments are directed to computer processor store queues, which allow load instructions to access uncommitted store data before it has been written to the cache or main memory.

2. Description of the Related Art

During operation, a computer processor can load instructions and data from memory and can store data to memory. As processor clock speeds have increased, data access from memory has become orders of magnitude slower than data access within the processor, leading to the development of on-chip data and instruction caches, which hold blocks of instructions and/or data that have been read from slower system memory in anticipation of being the target of a load instruction by the processor, and store queues, which hold data that is the target of a store instruction (which may also be referred to herein as a write instruction) by the processor. Store queues hold uncommitted data, i.e., data that has not yet been written to a cache or to main memory. Data within a store queue can be accessed as well, but for conventional store queues, this is a time-consuming task. Thus, there is a need for improved store queues.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, an apparatus includes a processor; and a dual store queue, comprising an in-order queue (IOQ) for storing uncommitted writes, and an uncommitted data gather queue (UGQ) for gathering uncommitted data, wherein the dual store queue is configured to: receive, from a processor, a first write instruction for writing first data to at least a portion of memory at a first memory address; allocate an IOQ entry corresponding to the first write instruction; and update a UGQ entry associated with the first memory address to contain the first data.

In an aspect, a method for processing uncommitted writes includes receiving, at a dual store queue comprising an IOQ for storing uncommitted writes and an UGQ for gathering uncommitted data, a first write instruction for writing first data to at least a portion of memory at a first memory address; creating an IOQ entry corresponding to the first write instruction; and updating a UGQ entry associated with the first memory address to contain the first data.

In an aspect, an apparatus includes means for receiving, at a dual store queue comprising an IOQ for storing uncommitted writes and an UGQ for gathering uncommitted data, a first write instruction for writing first data to at least a portion of memory at a first memory address; means for creating an IOQ entry corresponding to the first write instruction; and means for updating a UGQ entry associated with the first memory address to contain the first data.

In an aspect, a non-transitory computer-readable medium storing computer-executable instructions that, when executed by an apparatus, cause the apparatus to: receive, at a dual store queue comprising an IOQ for storing uncommitted writes, the IOQ comprising a plurality of IOQ entries, wherein each IOQ entry stores one uncommitted write to memory, and an UGQ for gathering uncommitted data, the UGQ comprising a plurality of UGQ entries, wherein each UGQ entry stores data gathered from one or more uncommitted writes to a given memory address and a byte valid indicator for indicating which bytes of the data associated with the given memory address are valid, a first write instruction for writing first data to at least a portion of memory at a first memory address; allocate an IOQ entry corresponding to the first write instruction; and allocate or updating a UGQ entry associated with the first memory address to contain the first data.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 3 illustrates a simplified block diagram of a processor and memory subsystem using a dual store queue, according to aspects of the disclosure.

FIG. 4 illustrates example fields used by an IOQ entry and a UGQ entry, according to aspects of the disclosure.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figures 1, 2:
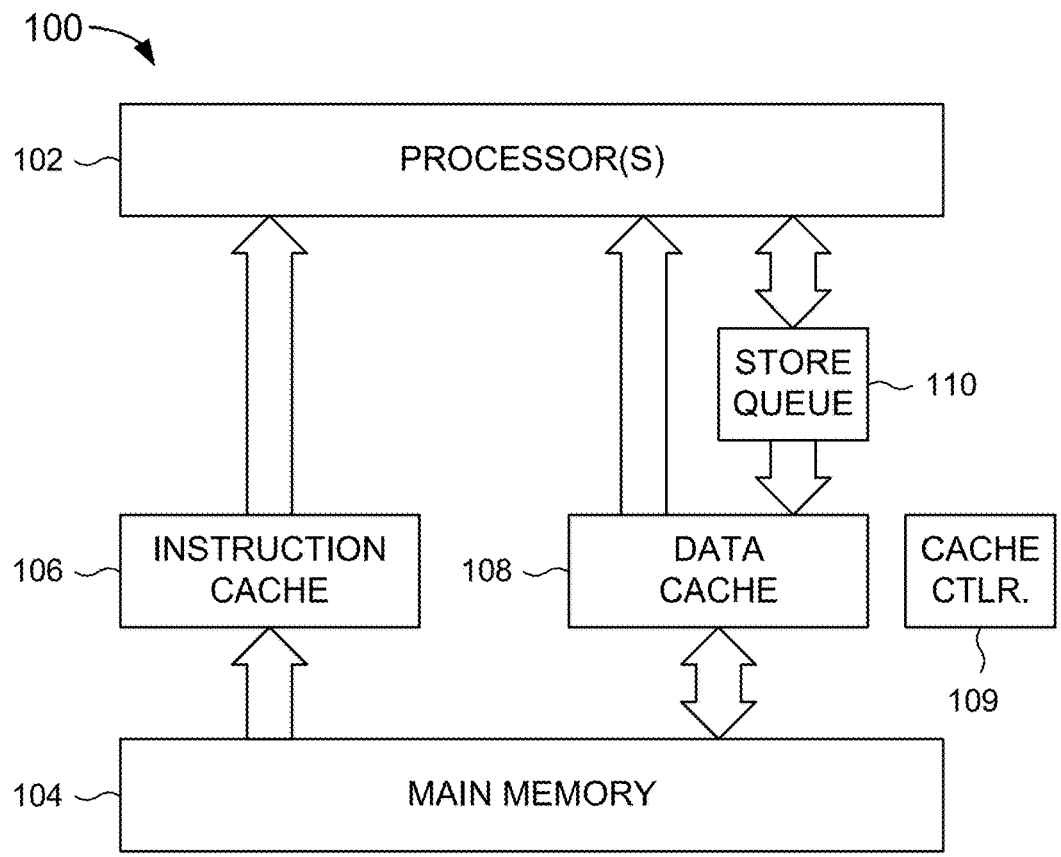
FIG. 1 illustrates a simplified block diagram of a conventional processor and memory subsystem.
FIG. 2 illustrates example contents of a conventional store queue.

FIG. 1 illustrates a simplified block diagram of a conventional processor and memory subsystem 100. In FIG. 1, one or more processor(s) 102 read instructions and data from main memory 104. For simplicity of description, operation by one or more of the processor(s) 102 may also be referred to herein as an operation by a processor 102 or by processors 102. Instructions are loaded from main memory 104 into an instruction cache 106, and can go from there to the processor(s) 102 for execution, e.g., via an instruction fetch. Data is loaded from main memory 104 into a data cache 108, and can go from there to the processor(s) 102, e.g., via a LOAD instruction. The instruction cache 106 and the data cache 108 are controlled by a cache controller 109. In the conventional processor and memory subsystem 100 shown in FIG. 1, the processor(s) 102 writes data to the data cache 108 via the store queue 110, e.g., via a STORE instruction. A STORE instruction typically specifies the data to be stored and the memory address to which the data is to be stored, and may specify the subset of bits at that memory address that are affected, e.g., such as when only one byte is written to a 32-bit or 64-bit wide memory location. The access speed of data between the main memory 104 and the instruction cache 106 or the data cache 108 is typically orders of magnitude slower than the access speed of data from the processor(s) 102 and the instruction cache 106 or the data cache 108.

Load latency is critical to processor performance in most applications. A store queue 110 reduces load latency by allowing a LOAD instruction to access uncommitted store data that has not yet been written to the data cache 108 or main memory 104. Thus, in the simplified architecture shown in FIG. 1, data to be stored at a particular address is first written to a store queue 110, until the data is "committed", after which the data can be written to the data cache 108 on its way to the main memory 104. Therefore, a conventional store queue 110 will have an entry for each uncommitted store operation, and that entry will record the particular address in main memory 104 where the data is to be stored, the subset of bits at that memory address that are affected, and the value written to that subset of bits.

The store queue 110 must write only committed data to the cache or main memory, and must handle uncommitted entries being flushed, meaning that the entry is no longer needed, e.g., because the data associated with that entry has been committed or had been identified as data to be discarded rather than committed, such as when the associated STORE command has been invalidated. For example, at any time prior to a commit operation, any of the uncommitted store operations may be invalidated, e.g., because the store was part of a series of instructions that were part of a predicted branch, but the actual branch was different from the predicted branch, in which case the entry for the invalidated store operation will be cleared from the store queue 110. Also, while waiting to be committed, a particular address in the main memory 104 may be updated or simply written to multiple times, and each time different subsets of the bits at that address may be overwritten. For these reasons, a conventional store queue 110 must store an entry for each store operation for each address. An example of a conventional store queue is shown in FIG. 2.

FIG. 2 illustrates example contents of a conventional store queue, such as storage queue 110. The storage queue 110 has thirty-two entries identified by index numbers 0-31. In the example illustrated in FIG. 2, the index numbers indicate the order of store operations, with lower numbers indicating store operations that occurred before higher numbers. Each entry stores information that identifies the address in main memory 104 (address), a bit field indicating which bytes are affected by the store (valid bytes), and the data to be stored (data) in hexadecimal. Each bit in the valid bytes bit field corresponds to one byte (8 bits) of the 64-bit data field, where a "1" in that bit of the valid bytes bit field indicates that the corresponding byte in the data field is valid (i.e., those bytes are overwritten by the STORE operation) and a "0" in that bit of the valid bytes bit field indicates that the corresponding byte in the data field is invalid (i.e., those bytes are not affected by the STORE operation). In FIG. 2, a hyphen ("-") in the data field indicates four bits of "don't care".

For example, in FIG. 2, there were four store operations involving the same address in main memory 104, shown as address "A" in FIG. 2. During the first store operation, shown as index 1, 64 bits of data, "0x0807060504030201", were written to bits [63:0] of address A. Later, 32 bits of data, "0x090A0B0C", were written to bits [63:32] of address A (index 3). Later, 16 bits of data "0x0D0E", were written to bits [15:0] of address A (index 5). Later, 8 bits of data, "0x0F", were written to bits [55:48] of address A (index 6).

At some point, the processor 102 may want to load data from a memory address. For example, the processor 102 may want to load data from memory address A. Since there is uncommitted data for address A still within the store queue 110, it would be faster to load data for address A from the store queue 110 rather than waiting until that data is committed and available from the data cache 108 or the main memory 104. However, in order to determine what that data would be had the load been from the data cache 108 or the main memory 104, the conventional store queue 110 must examine the list of entries associated with that address—in this example, entries 1, 3, 5, and 6 of the conventional store queue 110—and reconstruct what the data in main memory 104 would have been. For example:

after entry 1, the data would be "0x0807060504030201";
after entry 3, the data would be "0x090A0B0C04030201";
after entry 5, the data would be "0x090A0B0C04030D0E"; and
after entry 6, the data would be "0x090FB0C04030D0E,
. . . with the underlined text showing the change from the previous store result (it is presumed that entry 1 would overwrite all 64 bits of data that were previously at that address).

Since a particular load address may match multiple in-flight stores, the read logic for a traditional store queue must find all the writes to the particular address and select the youngest data for each byte. Thus, to load memory from a conventional store queue 110, it is necessary to examine each entry within the store queue 110, checking to see if the value of the address field and the valid byte indicators in the entry match the memory address and requested bytes for the load, and if so, comparing the valid bytes and age of that entry with those of all other matching entries to select the youngest data for each byte requested by the load. The time taken to load memory from the store queue 110 is proportional to the number of entries that the store queue 110 holds and thus is usually the limiting factor that determines the maximum size of a conventional store queue, such as store queue 110.

To overcome this technical limitation, a dual store queue architecture is herein presented, in which the store queue comprises an in-order queue that operates much like a conventional store queue, and also comprises a gather queue for uncommitted data.

FIG. 3 illustrates a simplified block diagram of a processor and memory subsystem 300 using a dual store queue 302, according to aspects of the disclosure. In FIG. 3, the one or more processors(s) 102, main memory 104, instruction cache 106, and data cache 108 are identical to the like-numbered elements in FIG. 1, and therefore their descriptions will not be repeated here. The dual store queue 302 comprises an in-order queue (IOQ) 304 and an uncommitted data gather queue (UGQ) 306, and snoops one or more cache invalidate signal(s) 308 provided by the cache controller 109 and/or the processor(s) 102. An entry in the IOQ 304 may be referred to herein as an "IOQ entry", and an entry in the UGQ 306 may be referred to herein as a "UGQ entry".

The IOQ 304 allocates one IOQ entry per store operation, and writes data to the data cache 108 and main memory 104 in the correct order (to avoid "write after write" errors). The IOQ 304 handles flushes by discarding any IOQ entries younger than the flush target and rebuilding any affected UGQ entries from the non-discarded IOQ entries.

The UGQ 306 allocates one UGQ entry per unique in-flight store address, and updates the relevant existing entry for a duplicate in-flight store address. Thus, the UGQ 306 always holds the youngest valid data for each in-flight store address. Because of this, the UGQ 306 handles all store queue reads for load instructions, and can provide the currently valid data for a particular in-flight store address with just one read operation regardless of the size of the in-order queue. Because the performance-critical read logic is simple, area, rather than performance, becomes the primary constraint on store queue size.

In some aspects, the UGQ 306 snoops cache invalidate signal(s) 308 and clears the valid bits of any affected bytes that do not have an in-flight write in the IOQ 304.

In some aspects, the UGQ 306 may also include previously committed data for an earlier in-flight write to a particular address even after that data has already left the in-order queue. That is, where the IOQ 304 may discard or clear data from IOQ entries that stored in-flight writes that have since been committed to the data cache 108 or the main memory 104, in some aspects the UGQ 306 does not discard or clear data associated with an address that was the target of an in-flight write once that data has been committed. Instead, the UGQ 306 may maintain that data until the UGQ entry needs to be reused, e.g., for an in-flight write to another address. As a result, if a subsequent load instruction targets an address for which the UGQ 306 has not yet cleared and reused the corresponding UGQ entry, the load data may be read from the UGQ 306 rather than from the data cache 108 or the main memory 104, providing an additional performance improvement. This feature is particularly useful if the data cache 108 does not allocate entries for writes.

FIG. 4 illustrates example fields used by an IOQ entry 400 and a UGQ entry 402, according to aspects of the disclosure. In the example illustrated in FIG. 4, an IOQ entry 400 includes the following fields, shown in the table below:

TABLE 1

In Order Queue Entry

| Field | Description |
| --- | --- |
| Byte Valid | A bit field having one bit for each byte of data in the memory aligned data field. A "1" indicates valid and a "0" indicates invalid. |
| Byte Is Youngest | A bit field having one bit for each byte of data in the memory aligned data field. A "1" indicates youngest and a "0" indicates not youngest. |
| Gather Queue Index | An integer pointer to an entry in the UGQ 306. |
| Physical Page Number | Indicates a page in physical memory. |
| Page Offset | Indicates an offset into the page in physical memory. |
| Instruction Identifier | Uniquely identifies an instruction within an instruction block. |
| Reorder Buffer Index | A pointer into the reorder buffer. |
| Address Is Virtual | A Boolean indicating whether the address is a virtual address. (1 = yes; 0 = no) |
| Address is Cacheable | A Boolean indicating whether the address is cacheable. (1 = yes; 0 = no) |
| Address is I/O | A Boolean indicating whether the address is input/output. (1 = yes; 0 = no) |
| Virtual Page Number | Indicates a virtual page in memory. |
| Address Space Identifier | Uniquely identifies each process and is used to provide address-space protection for that process. |
| Memory-Aligned Data | Data aligned on a 64-bit memory boundary. |

In the example shown in FIG. 4, some of the fields, such as the instruction identifier, the reorder buffer index, and other fields, have field names shown in italic font. These fields are ones that are not performance-critical and thus, in some aspects, may be implemented using SRAMs instead of flipflops to save area. That is, in some aspects, the IOQ may be implemented as a hybrid array with some columns as flip-flops and other columns as SRAM cells.

In the example illustrated in FIG. 4, a UGQ entry 402 includes the following fields, shown in the table below:

TABLE 1

Uncommitted Gather Queue Entry

| Field | Description |
|---|---|
| Byte Valid | A bit field having one bit for each byte of data in the memory aligned data field. A "1" indicates valid and a "0" indicates invalid. |
| Byte Is Pending | A bit field having one bit for each byte of data in the memory aligned data field. A "1" indicates that the there is an in-flight store that will write to this byte, but the data has not yet arrived at the store queue, and a "0" indicates that the data for the youngest in-flight write to the byte has arrived at the store queue and is available to be read by a load. The Byte is Pending bits are only valid for bytes with their Byte Valid bits set. |
| Physical Page Number | Indicates a page in physical memory. |
| Virtual Address | Indicates a virtual address in memory. |
| Address Space Identifier | Uniquely identifies each process and is used to provide address-space protection for that process. |
| Memory-Aligned Data | Data aligned on a 64-bit memory boundary. |

Figure 5:
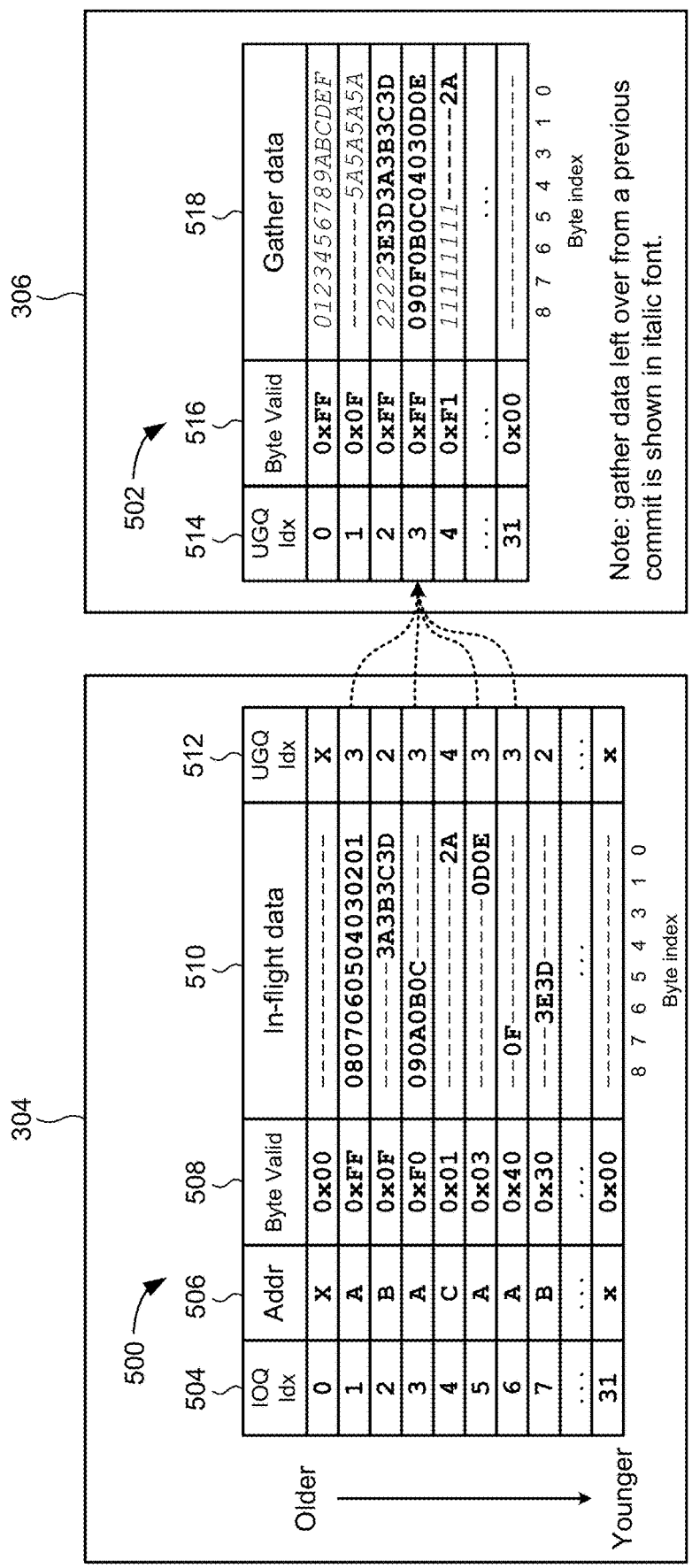
FIG. 5 illustrates data that may exist within an IOQ and UGQ according to aspects of the disclosure, after an example series of uncommitted (in-flight) writes.

FIG. 5 illustrates data that may exist within an IOQ 304 and UGQ 306 according to aspects of the disclosure, after an example series of uncommitted (in-flight) writes. In the example shown in FIG. 5, the IOQ 304 contains a queue structure 500 and the UGQ 306 contains a queue structure 502.

In the example shown in FIG. 5, the IOQ 304 queue structure 500 has 32 entries, each entry having at least the following fields: a IOQ entry index 504, a memory address 506, a byte valid bitfield 508, memory aligned in-flight data 510, and a field that conventional store queues do not include, a UGQ index 512, which points to an entry in the UGQ 306.

In the example shown in FIG. 5, the UGQ 306 queue structure 502 has 32 entries, each entry having at least the following fields: a UGQ entry index 514, a byte valid bitfield 516, and memory aligned uncommitted gather data 518.

It is noted that queue structure 500 and queue structure 502 are illustrative and not limiting. Other fields may be present, and the fields may exist in any order, not just the order shown in FIG. 5.

In FIG. 5, the IOQ index 504 lists uncommitted stores in order of oldest to youngest, with older stores having lower index numbers than younger stores. Thus, FIG. 5 shows that there were four writes to address "A", recorded in IOQ queue structure 500 at IOQ index 1, 3, 5, and 6, in that order.

In the example shown in FIG. 5, the first write to address "A" (IOQ index=1) was to write 64 bits of memory aligned data—i.e., hexadecimal data 0x0807060504030201—which is stored in the data field 510. Since all 8 bytes of memory-aligned data were updated, the byte valid bitfield 508 contains hexadecimal data 0xFF, to show that each byte in the data field 510 is valid. At this point, the UGQ 306 does not have an entry for address "A", so an available UGQ entry was selected—in this example, UGQ entry 3. The gather data 518 for UGQ entry 3 is updated, and will contain 0x0807060504030201.

The next write to address "A" (IOQ index=3) was to write 0x090A0B0C to the bytes 8-5 of address "A". The gather data 518 for UGQ entry 3 is updated, and will now contain 0x090A0B0C04030201.

The next write to address "A" (IOQ index=5) was to write 0x0D0E to bytes 1-0 of address "A". The gather data 518 for UGQ entry 3 is updated, and will now contain 0x090A0B0C04030D0E.

The final write to address "A" (IOQ index=6) was to write 0x0F to byte 7 of address "A". The gather data 518 for UGQ entry 3 is updated, and will now contain 0x090F0B0C04030D0E.

At this point, if the processor(s) 102 receive an instruction to load data from address "A", the processor(s) 102 may load data from UGQ entry 3 of the UGQ 306 rather than from the data cache 108 or the main memory 104.

Applying the same process to IOQ entries involving a write to address "B", which in this example are gathered in UGQ entry 2, will result in the bytes 5 and 4 of UGQ entry 2 containing data from the write in IOQ entry 7, and the bytes 3-0 of UGQ entry 2 containing data from the write in IOQ entry 2.

FIG. 5 illustrates the point, however, that the UGQ 306 queue structure 502 may contain data associated with an earlier, committed write to the same memory address. For example, bytes 8 and 7 of UGQ entry 2 contain valid data from an earlier set of one or more writes to address "B" that was committed to the data cache 108 or the main memory 104. In FIG. 5, data in the UGQ 306 queue structure 502 that is left over from previously uncommitted data that was later committed but not cleared from the UGQ 306 is shown in italic font.

In some aspects, when the UGQ 306 detects a cache invalidate that applies to any of its entries, the UGQ 306 clears the valid bits for all the affected bytes that do not have an in-flight write still in the in-order queue. Since the data does not need to be updated, and the age order of the matching in-order queue entries is irrelevant, this logic can easily fit in a single cycle.

When the dual store queue 302 detects a cache flush, the IOQ 304 may invalidate its affected entries, mark their corresponding UGQ 306 entries as needing restoration, and rebuild the affected UGQ 306 entries based on the surviving IOQ 304 entries. This logic for rebuilding the youngest valid data is very similar to traditional store queue reads for loads, but it is not performance critical. In some aspects, the dual store queue 302 can take multiple cycles to read the relevant IOQ 304 entries without affecting flush recovery time.

FIG. 6A through FIG. 6E are flowcharts showing portions of an example process 600 associated with processing uncommitted writes. In some implementations, one or more process blocks of FIGS. 6A-6E may be performed by an apparatus (e.g., dual store queue 302 in FIG. 3).

Figure 6A:
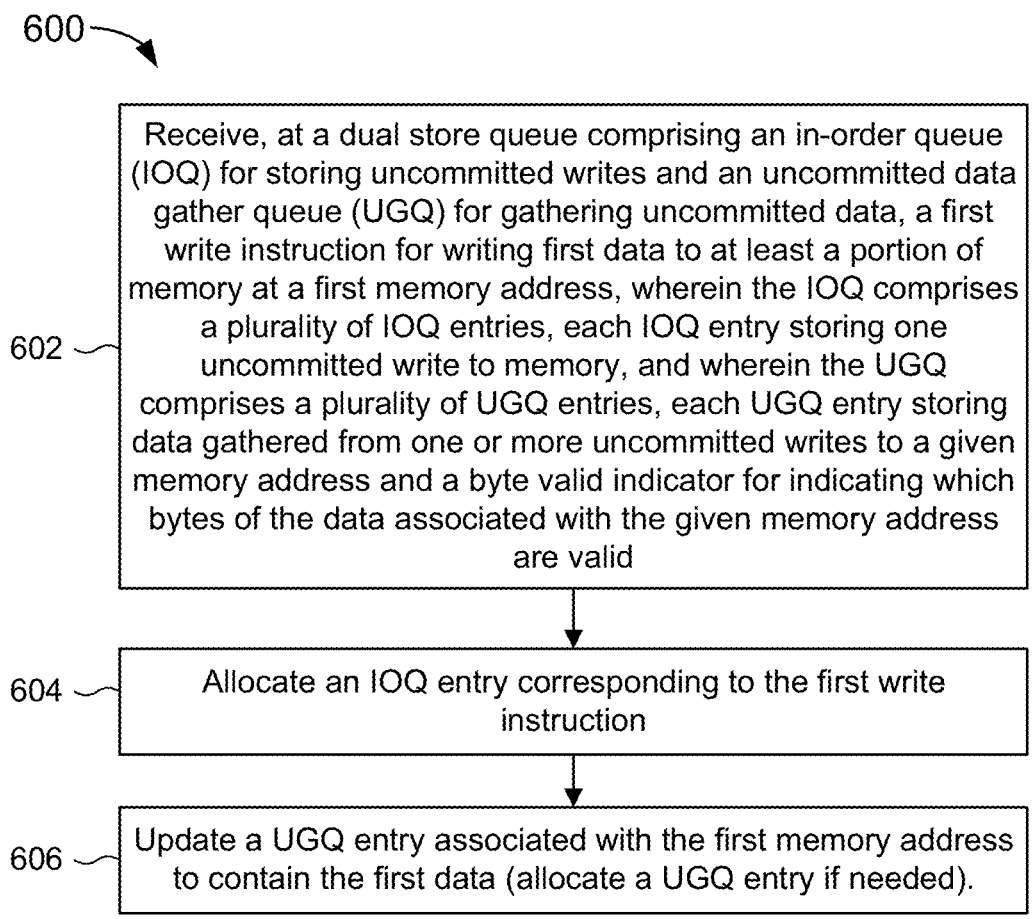
FIG. 6A through FIG. 6E are flowcharts showing portions of an example process 600 associated with processing uncommitted writes.

As shown in FIG. 6A, process 600 may include receiving, at a dual store queue 302 comprising an in-order queue (IOQ) 304 for storing uncommitted writes and an uncommitted data gather queue (UGQ) 306 for gathering uncommitted data, a first write instruction for writing first data to at least a portion of memory at a first memory address (block 602), wherein the IOQ comprises a plurality of IOQ entries, each IOQ entry storing one uncommitted write to memory, and wherein the UGQ comprises a plurality of UGQ entries, each UGQ entry storing data gathered from one or more uncommitted writes to a given memory address and a byte valid indicator for indicating which bytes of the data associated with the given memory address are valid, a first write instruction for writing first data to at least a portion of memory at a first memory address (block 602).

As further shown in FIG. 6A, process 600 may include creating an IOQ entry corresponding to the first write instruction (block 604). For example, the IOQ 304 may allocate an IOQ entry corresponding to the first write instruction, as described above.

As further shown in FIG. 6A, process 600 may include updating a UGQ entry associated with the first memory address to contain the first data (block 606). In some aspects, updating the UGQ entry associated with the first memory address to contain the first data comprises determining whether the UGQ contains a UGQ entry associated with the first memory address. Upon a determination that the UGQ does not contain a UGQ entry associated with the first memory address, UGQ entry associated with the first memory address is allocated, the first data is stored in the UGQ entry, and the byte valid indicator of the UGQ entry is set to indicate which bytes of the data in the UGQ entry are valid. Upon a determination that the UGQ already contains a UGQ entry associated with the first memory address, the UGQ entry associated with the first memory address is updated to include the first data, and the byte valid indicator of the UGQ entry is updated to indicate which bytes of the data in the UGQ entry are valid.

In some aspects, updating the UGQ entry associated with the first memory address to include the first data comprises overwriting portions of the data currently stored in the UGQ entry with corresponding portions of the first data that are valid and not overwriting portions of the data currently stored in the UGQ entry that correspond to portions of the first data that are not valid.

Figure 6B:
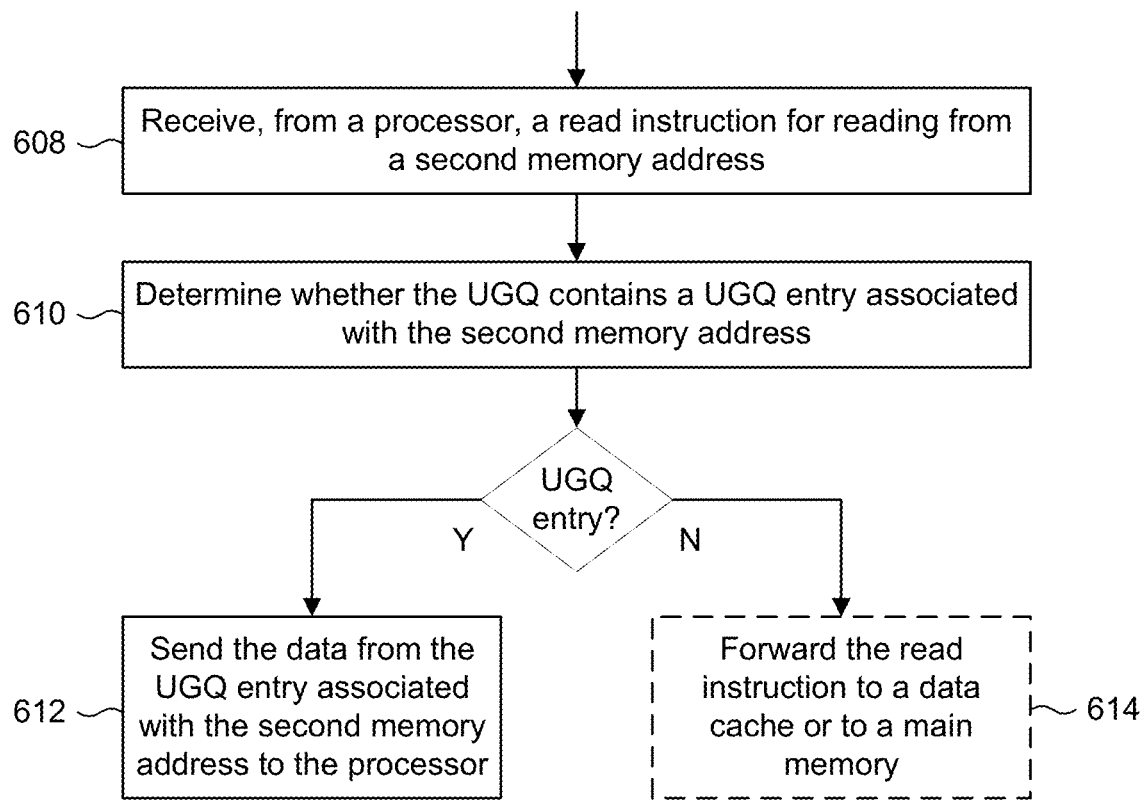

As shown in FIG. 6B, in some aspects, process 600 further includes receiving, from a processor, a read instruction for reading from a second memory address (block 608), and determining whether the UGQ contains a UGQ entry associated with the second memory address (block 610). If the UGQ contains a UGQ entry associated with the second memory address, the process includes sending the data from the UGQ entry associated with the second memory address to the processor (block 612). In some aspects, the read instruction is broadcast to both the dual store queue 302 and the data cache 108; both respond with any matches, but any data returned by the store queue takes priority because it is newer. In these aspects, if the UGQ does not contain a UGQ entry associated with the second memory address, the UGQ does nothing: if the read request is not completely fulfilled by the internal storage structures, then the read request may be forwarded to main memory by logic outside the dual store queue 302. In other aspects, if the UGQ does not contain a UGQ entry associated with the second memory address, the process may include forwarding the read instruction to a memory cache or to a main memory (optional block 614).

Figure 6C:
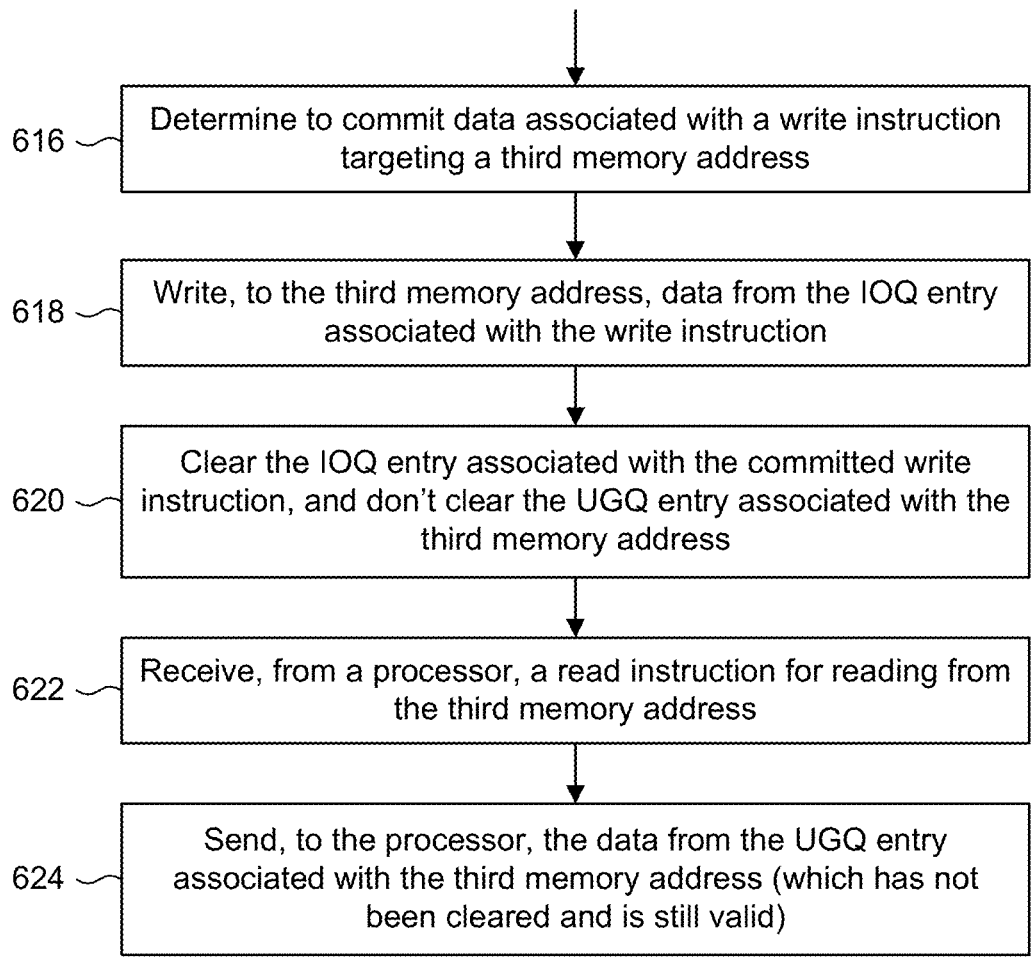

As shown in FIG. 6C, in some aspects, process 600 includes determining to commit data associated with a write instruction targeting a third memory address (block 616), writing, to the third memory address, data from the IOQ entry associated with the write instruction (block 618), and clearing the IOQ entry associated with the committed write instruction but not clearing the UGQ entry associated with the third memory address (block 620). In some aspects, process further includes receiving, from a processor, a read instruction for reading from the third memory address (block 622), and sending, to the processor, the data from the UGQ entry associated with the third memory address which has not been cleared and is still valid (block 624).

Figure 6D:
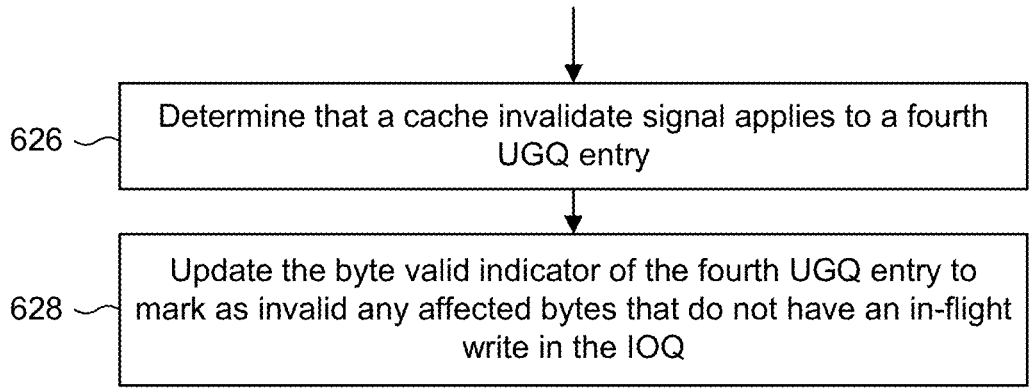

As shown in FIG. 6D, in some aspects, process 600 includes determining that a cache invalidate signal applies to a fourth UGQ entry (block 626), and updating the byte valid indicator of the fourth UGQ entry to mark as invalid any affected bytes that do not have an in-flight write in the IOQ (block 628).

Figure 6E:
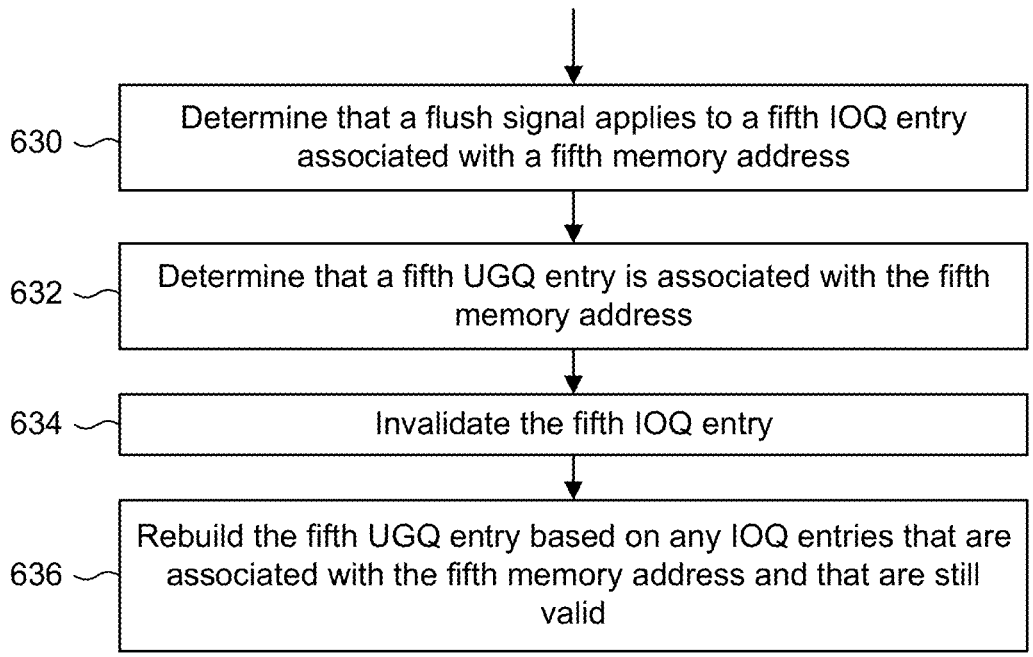

As shown in FIG. 6E, in some aspects, process 600 includes determining that a flush signal applies to a fifth IOQ entry associated with a fifth memory address (block 630). IOQ and conventional store queue entries get invalidated either when their in-flight store is flushed and discarded or when their in-flight store is committed and the data gets written to the cache and/or main memory. If there are no empty entries in the IOQ, any new store instructions have to hold until an empty entry becomes available.

As further shown in FIG. 6E, process 600 may also include determining that a fifth UGQ entry is associated with the fifth memory address (block 632), invalidating the fifth IOQ entry (block 634), and rebuilding the fifth UGQ entry based on any IOQ entries that are associated with the fifth memory address and that are still valid (block 636). In some aspects, gather queue entries are emptied only when they are affected by a cache invalidate or a flush and there are no in-flight stores to their address remaining in the IOQ. When a new UGQ entry is needed, the allocation logic will pick an empty entry if it can; but if there are no empty entries, it will overwrite an entry that is still valid but no longer has any corresponding IOQ entries (i.e. all of its data is committed, has left the IOQ, and is available from the cache or main memory). In some implementations, the UGQ is guaranteed to have at least one entry eligible for allocation if there is an empty slot in the IOQ. In alternative implementations where this wasn't true (i.e. if there are fewer UGQ entries than IOQ entries), additional logic is used to detect when no UGQ entries were available and force an incoming store instruction to hold until an existing entry was either emptied by a flush (which would also flush the incoming store) or entirely committed and its last corresponding IOQ entry emptied, making it eligible to be reclaimed. Note that a cache invalidate will not empty an entry that is not already eligible to be reclaimed.

Process 600 may include additional implementations, such as any single implementation or any combination of implementations described below and/or in connection with one or more other processes described elsewhere herein. Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As will be appreciated, a technical advantage of the method 600 is that the UGQ 306 stores the newest data for a memory location that is the subject of one or more in-flight (uncommitted) writes, so that a read from a memory location that has uncommitted writes can be handled by the UGQ 306, without the need to traverse the IOQ 304 and reconstruct the currently valid data for that memory location, as is done in conventional store queues.

Figure 7:
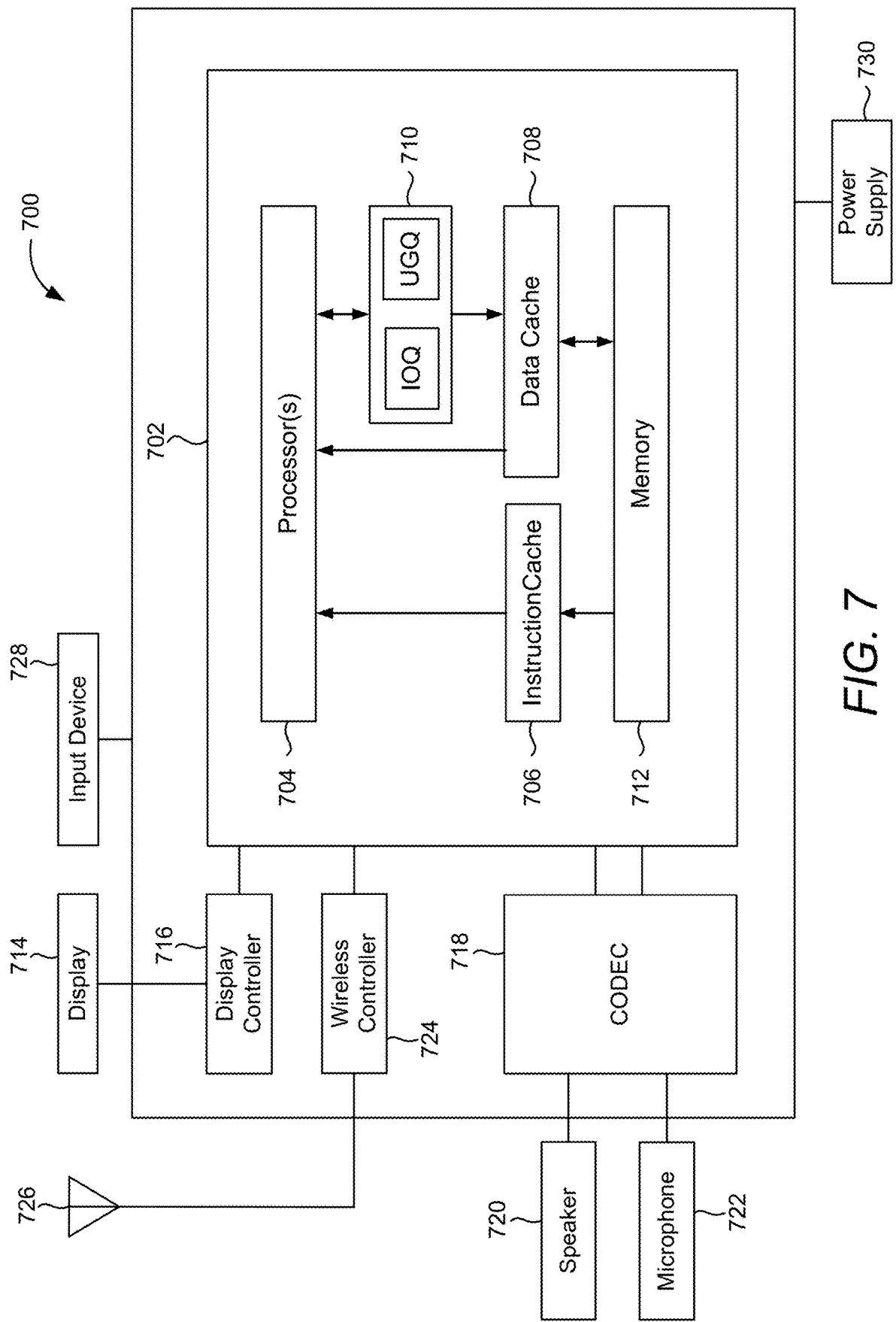
FIG. 7 illustrates an exemplary mobile device in accordance with some examples of the disclosure.

FIG. 7 illustrates an exemplary mobile device in accordance with some examples of the disclosure. Referring now to FIG. 7, a block diagram of a mobile device that is configured according to exemplary aspects is depicted and generally designated mobile device 700. In some aspects, mobile device 700 may be configured as a wireless communication device. As shown, mobile device 700 includes apparatus 702. Apparatus 702 is shown to comprise processor(s) 704, an instruction cache 706, a data cache 708, and a dual store queue 710 comprising an in-order queue (IOQ) and an uncommitted data gather queue (UGQ). Other well-known details (e.g., counters, entries, confidence fields, weighted sum, comparator, etc.) of these blocks have been omitted from this view of apparatus 702 for the sake of clarity. Apparatus 702 may be communicatively coupled to memory 712 over a link, which may be a die-to-die or chip-to-chip link. Mobile device 700 also includes display 714 and display controller 716, with display controller 716 coupled to apparatus 702 and to display 714.

In some aspects, FIG. 7 may include coder/decoder (CODEC) 718 (e.g., an audio and/or voice CODEC) coupled to apparatus 702; speaker 720 and microphone 722 coupled to CODEC 718; and wireless controller circuits 724 (which may include a modem, radio frequency (RF) circuitry, filters, etc., which may be implemented using one or more flip-chip devices, as disclosed herein) coupled to wireless antenna 726 and to apparatus 702.

In a particular aspect, where one or more of the above-mentioned blocks are present, apparatus 702, display controller 716, memory 712, CODEC 718, and wireless controller circuits 724 can be included in a system-in-package or system-on-chip device, which may be implemented in whole or part using the techniques disclosed herein. Input device 728 (e.g., physical or virtual keyboard), power supply 730 (e.g., battery), display 714, input device 728, speaker 720, microphone 722, wireless antenna 726, and power supply 730 may be external to the system-on-chip device and may be coupled to a component of the system-on-chip device, such as an interface or a controller.

It should be noted that although FIG. 7 depicts a mobile device, the apparatus 702 and memory 712 may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Figure 8:
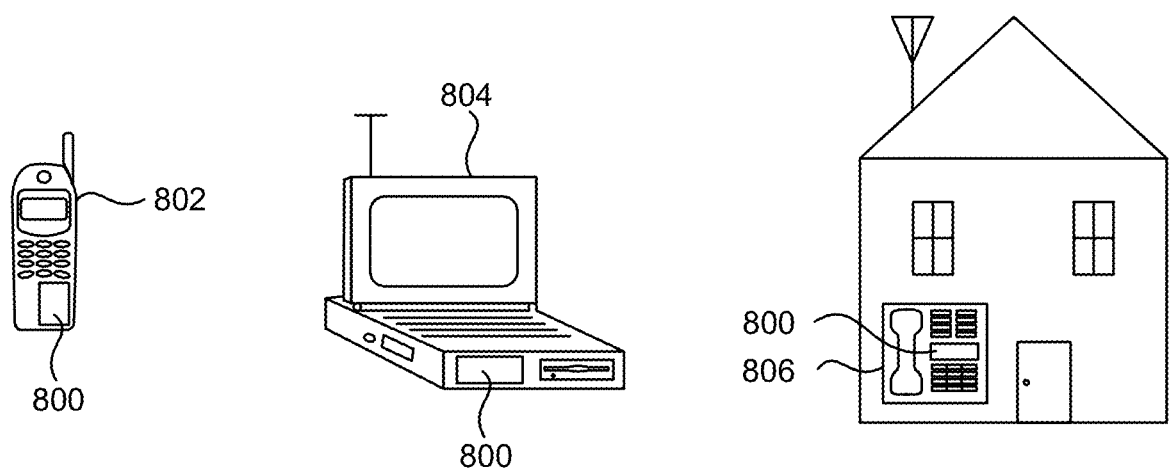
FIG. 8 illustrates various electronic devices that may be integrated with any of the aforementioned apparatus in accordance with various examples of the disclosure.

FIG. 8 illustrates various electronic devices that may be integrated with any of the aforementioned apparatus in accordance with various examples of the disclosure. For example, a mobile phone device 802, a laptop computer device 804, and a fixed location terminal device 806 may each be considered generally user equipment (UE) and may include an apparatus 800, such as apparatus 300 as described herein, for example. The device may be, for example, any of the integrated circuits, dies, integrated devices, integrated device packages, integrated circuit devices, device packages, integrated circuit (IC) packages, package-on-package devices described herein. The mobile phone device 802, laptop computer device 804, and fixed location terminal device 806 illustrated in FIG. 8 are merely exemplary. Other electronic devices may also feature device including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), an Internet of things (IoT) device or any other device that stores or retrieves data or computer instructions or any combination thereof.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. An apparatus, comprising: a processor; and a dual store queue, comprising an in-order queue (IOQ) for storing uncommitted writes, and an uncommitted data gather queue (UGQ) for gathering uncommitted data, wherein the dual store queue is configured to: receive, from a processor, a first write instruction for writing first data to at least a portion of memory at a first memory address; allocate an IOQ entry corresponding to the first write instruction; and update a UGQ entry associated with the first memory address to contain the first data.

Clause 2. The apparatus of clause 1, wherein the IOQ comprises a plurality of IOQ entries, wherein each IOQ entry stores one uncommitted write to memory.

Clause 3. The apparatus of any of clauses 1 to 2, wherein the UGQ comprises a plurality of UGQ entries, wherein each UGQ entry stores data gathered from one or more uncommitted writes to a given memory address and a byte valid indicator for indicating which bytes of the data associated with the given memory address are valid Clause 4. The apparatus of any of clauses 1 to 3, wherein, to update the UGQ entry associated with the first memory address to contain the first data, the dual store queue is configured to update an existing UGQ entry associated with the first memory address or to allocate a new UGQ entry and associate the new UGQ entry with the first memory address.

Clause 5. The apparatus of any of clauses 1 to 4, wherein, to update the UGQ entry associated with the first memory address to contain the first data, the dual store queue is configured to: determine whether the UGQ contains a UGQ entry associated with the first memory address; upon a determination that the UGQ does not contain a UGQ entry associated with the first memory address, allocate a UGQ entry associated with the first memory address, store the first data in the UGQ entry, and set the byte valid indicator of the UGQ entry to indicate which bytes of the data in the UGQ entry are valid; and upon a determination that the UGQ contains a UGQ entry associated with the first memory address, update the UGQ entry associated with the first memory address to include the first data, and update the byte valid indicator of the UGQ entry to indicate which bytes of the data in the UGQ entry are valid.

Clause 6. The apparatus of clause 5, wherein, to update the UGQ entry associated with the first memory address to include the first data, the dual store queue is configured to overwrite portions of the data currently stored in the UGQ entry with corresponding portions of the first data that are valid and to not overwrite portions of the data currently stored in the UGQ entry that correspond to portions of the first data that are not valid.

Clause 7. The apparatus of any of clauses 1 to 6, wherein the dual store queue is further configured to: receive, from the processor, a read instruction for reading from a second memory address; determine whether the UGQ contains a UGQ entry associated with the second memory address; and send the data from the UGQ entry associated with the second memory address to the processor upon a determination that the UGQ contains a UGQ entry associated with the second memory address.

Clause 8. The apparatus of clause 7, wherein the dual store queue is further configured to: forward the read instruction to a memory cache or to a main memory upon a determination that the UGQ does not contain a UGQ entry associated with the second memory address.

Clause 9. The apparatus of any of clauses 1 to 8, wherein the dual store queue is further configured to: determine to commit data associated with a write instruction targeting a third memory address; write, to the third memory address, data from a IOQ entry associated with the committed write instruction; clear the IOQ entry associated with the committed write instruction; and not clear the UGQ entry associated with the third memory address.

Clause 10. The apparatus of clause 9, wherein the dual store queue is further configured to: receive, from the processor, a read instruction for reading from the third memory address; and send, to the processor, the data from the UGQ entry associated with the third memory address.

Clause 11. The apparatus of any of clauses 1 to 10, wherein the UGQ is further configured to: determine that a cache invalidate signal applies to a fourth UGQ entry; and update the byte valid indicator of the fourth UGQ entry to mark as invalid any affected bytes that do not have an in-flight write in the IOQ.

Clause 12. The apparatus of any of clauses 1 to 11, wherein the IOQ is further configured to: determine that a flush signal applies to a fifth IOQ entry associated with a fifth memory address; determine that a fifth UGQ entry is associated with the fifth memory address; invalidate the fifth IOQ entry; and rebuild the fifth UGQ entry based on any IOQ entries that are associated with the fifth memory address and that are still valid.

Clause 13. A method for processing uncommitted writes, the method comprising: receiving, at a dual store queue comprising an in-order queue (IOQ) for storing uncommitted writes and an uncommitted data gather queue (UGQ) for gathering uncommitted data, a first write instruction for writing first data to at least a portion of memory at a first memory address; creating an IOQ entry corresponding to the first write instruction; and updating a UGQ entry associated with the first memory address to contain the first data.

Clause 14. The method of clause 13, wherein the IOQ comprises a plurality of IOQ entries, wherein each IOQ entry stores one uncommitted write to memory.

Clause 15. The method of any of clauses 13 to 14, wherein the UGQ comprises a plurality of UGQ entries, wherein each UGQ entry stores data gathered from one or more uncommitted writes to a given memory address and a byte valid indicator for indicating which bytes of the data associated with the given memory address are valid Clause 16. The method of any of clauses 13 to 15, wherein updating the UGQ entry associated with the first memory address to contain the first data, comprises updating an existing UGQ entry associated with the first memory address or allocating a new UGQ entry and associating the new UGQ entry with the first memory address.

Clause 17. The method of any of clauses 13 to 16, wherein creating or updating the UGQ entry associated with the first memory address to contain the first data comprises: determining whether the UGQ contains a UGQ entry associated with the first memory address; upon a determination that the UGQ does not contain a UGQ entry associated with the first memory address, creating a UGQ entry associated with the first memory address, storing the first data in the UGQ entry, and setting the byte valid indicator of the UGQ entry to indicate which bytes of the data in the UGQ entry are valid; and upon a determination that the UGQ contains a UGQ entry associated with the first memory address, updating the UGQ entry associated with the first memory address to include the first data, and updating the byte valid indicator of the UGQ entry to indicate which bytes of the data in the UGQ entry are valid.

Clause 18. The method of clause 17, wherein updating the UGQ entry associated with the first memory address to include the first data comprises overwriting portions of the data currently stored in the UGQ entry with corresponding portions of the first data that are valid and not overwriting portions of the data currently stored in the UGQ entry that correspond to portions of the first data that are not valid.

Clause 19. The method of any of clauses 13 to 18, further comprising: receiving, from a processor, a read instruction for reading from a second memory address; determining whether the UGQ contains a UGQ entry associated with the second memory address; and sending the data from the UGQ entry associated with the second memory address to the processor upon a determination that the UGQ contains a UGQ entry associated with the second memory address.

Clause 20. The method of clause 19, further comprising: forwarding the read instruction to a memory cache or to a main memory upon a determination that the UGQ does not contain a UGQ entry associated with the second memory address.

Clause 21. The method of any of clauses 13 to 20, further comprising: determining to commit data associated with a write instruction targeting a third memory address; writing, to the third memory address, data from a IOQ entry associated with the committed write instruction; clearing the IOQ entry associated with the committed write instruction; and not clearing the UGQ entry associated with the third memory address.

Clause 22. The method of clause 21, further comprising: receiving, from a processor, a read instruction for reading from the third memory address; and sending, to the processor, the data from the UGQ entry associated with the third memory address.

Clause 23. The method of any of clauses 13 to 22, further comprising: determining that a cache invalidate signal applies to a fourth UGQ entry; and updating the byte valid indicator of the fourth UGQ entry to mark as invalid any affected bytes that do not have an in-flight write in the IOQ.

Clause 24. The method of any of clauses 13 to 23, further comprising: determining that a flush signal applies to a fifth IOQ entry associated with a fifth memory address; determining that a fifth UGQ entry is associated with the fifth memory address; invalidating the fifth IOQ entry; and rebuilding the fifth UGQ entry based on any IOQ entries that are associated with the fifth memory address and that are still valid.

Clause 25. An apparatus, comprising: means for receiving, at a dual store queue comprising an in-order queue (IOQ) for storing uncommitted writes and an uncommitted data gather queue (UGQ) for gathering uncommitted data, a first write instruction for writing first data to at least a portion of memory at a first memory address; means for creating an IOQ entry corresponding to the first write instruction; and means for updating a UGQ entry associated with the first memory address to contain the first data.

Clause 26. The apparatus of clause 25, wherein the IOQ comprises means for storing a plurality of IOQ entries, wherein each IOQ entry stores one uncommitted write to memory.

Clause 27. The apparatus of any of clauses 25 to 26, wherein the UGQ comprises means for storing a plurality of UGQ entries, wherein each UGQ entry stores data gathered from one or more uncommitted writes to a given memory address and a byte valid indicator for indicating which bytes of the data associated with the given memory address are valid Clause 28. The apparatus of any of clauses 25 to 27, wherein the means for updating the UGQ entry associated with the first memory address to contain the first data comprises means for updating an existing UGQ entry associated with the first memory address or for allocating a new UGQ entry and associating the new UGQ entry with the first memory address.

Clause 29. The apparatus of any of clauses 25 to 28, wherein the means for creating or updating the UGQ entry associated with the first memory address to contain the first data comprises means for: determining whether the UGQ contains a UGQ entry associated with the first memory address; upon a determination that the UGQ does not contain a UGQ entry associated with the first memory address, creating a UGQ entry associated with the first memory address, storing the first data in the UGQ entry, and setting the byte valid indicator of the UGQ entry to indicate which bytes of the data in the UGQ entry are valid; and upon a determination that the UGQ contains a UGQ entry associated with the first memory address, updating the UGQ entry associated with the first memory address to include the first data, and updating the byte valid indicator of the UGQ entry to indicate which bytes of the data in the UGQ entry are valid.

Clause 30. The apparatus of clause 29, wherein the means for updating the UGQ entry associated with the first memory address to include means for the first data comprises means for overwriting portions of the data currently stored in the UGQ entry with corresponding portions of the first data that are valid and not overwriting portions of the data currently stored in the UGQ entry that correspond to portions of the first data that are not valid.

Clause 31. The apparatus of any of clauses 25 to 30, further comprising: means for receiving, from a processor, a read instruction for reading from a second memory address; means for determining whether the UGQ contains a UGQ entry associated with the second memory address; and means for sending the data from the UGQ entry associated with the second memory address to the processor upon a determination that the UGQ contains a UGQ entry associated with the second memory address.

Clause 32. The apparatus of clause 31, further comprising: means for forwarding the read instruction to a memory cache or to a main memory upon a determination that the UGQ does not contain a UGQ entry associated with the second memory address.

Clause 33. The apparatus of any of clauses 25 to 32, further comprising: means for determining to commit data associated with a write instruction targeting a third memory address; means for writing, to the third memory address, data from a IOQ entry associated with the committed write instruction; means for clearing the IOQ entry associated with the committed write instruction; and not clearing the UGQ entry associated with the third memory address.

Clause 34. The apparatus of clause 33, further comprising: means for receiving, from a processor, a read instruction for reading from the third memory address; and means for sending, to the processor, the data from the UGQ entry associated with the third memory address.

Clause 35. The apparatus of any of clauses 25 to 34, further comprising: means for determining that a cache invalidate signal applies to a fourth UGQ entry; and means for updating the byte valid indicator of the fourth UGQ entry to mark as invalid any affected bytes that do not have an in-flight write in the IOQ.

Clause 36. The apparatus of any of clauses 25 to 35, further comprising: means for determining that a flush signal applies to a fifth IOQ entry associated with a fifth memory address; means for determining that a fifth UGQ entry is associated with the fifth memory address; means for invalidating the fifth IOQ entry; and means for rebuilding the fifth UGQ entry based on any IOQ entries that are associated with the fifth memory address and that are still valid.

Clause 37. A non-transitory computer-readable medium storing computer-executable instructions that, when executed by an apparatus, cause the apparatus to: receive, at a dual store queue comprising an in-order queue (IOQ) for storing uncommitted writes, the IOQ comprising a plurality of IOQ entries, wherein each IOQ entry stores one uncommitted write to memory, and an uncommitted data gather queue (UGQ) for gathering uncommitted data, the UGQ comprising a plurality of UGQ entries, wherein each UGQ entry stores data gathered from one or more uncommitted writes to a given memory address and a byte valid indicator for indicating which bytes of the data associated with the given memory address are valid, a first write instruction for writing first data to at least a portion of memory at a first memory address; allocate an IOQ entry corresponding to the first write instruction; and allocate or updating a UGQ entry associated with the first memory address to contain the first data.

Clause 37. An apparatus comprising a memory, a transceiver, and a processor communicatively coupled to the memory and the transceiver, the memory, the transceiver, and the processor configured to perform a method according to any of clauses 13 to 24.

Clause 38. An apparatus comprising means for performing a method according to any of clauses 13 to 24.

Clause 39. A non-transitory computer-readable medium storing computer-executable instructions, the computer-executable comprising at least one instruction for causing a computer or processor to perform a method according to any of clauses 13 to 24.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., a user equipment (UE)). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An apparatus, comprising:
    a processor; and
    a dual store queue, comprising an in-order queue (IOQ) for storing uncommitted writes, and an uncommitted data gather queue (UGQ) for gathering uncommitted data, wherein the dual store queue is configured to:
        receive, from the processor, a first write instruction for writing first data to at least a portion of memory at a first memory address;
        allocate an IOQ entry corresponding to the first write instruction;
        update a UGQ entry associated with the first memory address to contain the first data;
        receive, from the processor, a read instruction for reading from a second memory address;
        determine whether the UGQ contains a UGQ entry associated with the second memory address;
        determine to commit data associated with a write instruction targeting a third memory address;
        write, to the third memory address, data from a IOQ entry associated with the committed write instruction;
        clear the IOQ entry associated with the committed write instruction; and
        not clear the UGQ entry associated with the third memory address.

2. The apparatus of claim 1, wherein the IOQ comprises a plurality of IOQ entries, wherein each IOQ entry stores one uncommitted write to memory.

3. The apparatus of claim 1, wherein the UGQ comprises a plurality of UGQ entries, wherein each UGQ entry stores data gathered from one or more uncommitted writes to a given memory address and a byte valid indicator for indicating which bytes of the data associated with the given memory address are valid.

4. The apparatus of claim 1, wherein, to update the UGQ entry associated with the first memory address to contain the first data, the dual store queue is configured to update an existing UGQ entry associated with the first memory address or to allocate a new UGQ entry and associate the new UGQ entry with the first memory address.

5. The apparatus of claim 1, wherein, to update the UGQ entry associated with the first memory address to contain the first data, the dual store queue is configured to:
    determine whether the UGQ contains a UGQ entry associated with the first memory address;
    upon a determination that the UGQ does not contain a UGQ entry associated with the first memory address, allocate a UGQ entry associated with the first memory address, store the first data in the UGQ entry, and set a byte valid indicator of the UGQ entry to indicate which bytes of data in the UGQ entry are valid; and upon a determination that the UGQ contains a UGQ entry associated with the first memory address, update the UGQ entry associated with the first memory address to include the first data, and update the byte valid indicator of the UGQ entry to indicate which bytes of the data in the UGQ entry are valid.

6. The apparatus of claim 5, wherein, to update the UGQ entry associated with the first memory address to include the first data, the dual store queue is configured to overwrite portions of the data currently stored in the UGQ entry with corresponding portions of the first data that are valid and to not overwrite portions of the data currently stored in the UGQ entry that correspond to portions of the first data that are not valid.

7. The apparatus of claim 1, wherein the dual store queue is further configured to:
send data from the UGQ entry associated with the second memory address to the processor upon a determination that the UGQ contains a UGQ entry associated with the second memory address.

8. The apparatus of claim 7, wherein the dual store queue is further configured to:
forward the read instruction to a memory cache or to a main memory upon a determination that the UGQ does not contain a UGQ entry associated with the second memory address.

9. The apparatus of claim 1, wherein the dual store queue is further configured to:
receive, from the processor, a read instruction for reading from the third memory address; and
send, to the processor, the data from the UGQ entry associated with the third memory address.

10. The apparatus of claim 1, wherein the UGQ is further configured to:
determine that a cache invalidate signal applies to a fourth UGQ entry; and
update a byte valid indicator of the fourth UGQ entry to mark as invalid any affected bytes that do not have an in-flight write in the IOQ.

11. The apparatus of claim 1, wherein the IOQ is further configured to:
determine that a flush signal applies to a fifth IOQ entry associated with a fifth memory address;
determine that a fifth UGQ entry is associated with the fifth memory address;
invalidate the fifth IOQ entry; and
rebuild the fifth UGQ entry based on any IOQ entries that are associated with the fifth memory address and that are still valid.

12. A method for processing uncommitted writes, the method comprising:
receiving, at a dual store queue comprising an in-order queue (IOQ) for storing uncommitted writes and an uncommitted data gather queue (UGQ) for gathering uncommitted data, a first write instruction for writing first data to at least a portion of memory at a first memory address;
creating an IOQ entry corresponding to the first write instruction;
updating a UGQ entry associated with the first memory address to contain the first data;
receiving, from a processor, a read instruction for reading from a second memory address;
determining whether the UGQ contains a UGQ entry associated with the second memory address;
determining to commit data associated with a write instruction targeting a third memory address;
writing, to the third memory address, data from a IOQ entry associated with the committed write instruction;
clearing the IOQ entry associated with the committed write instruction; and
not clearing the UGQ entry associated with the third memory address.

13. The method of claim 12, wherein the IOQ comprises a plurality of IOQ entries, wherein each IOQ entry stores one uncommitted write to memory.

14. The method of claim 12, wherein the UGQ comprises a plurality of UGQ entries, wherein each UGQ entry stores data gathered from one or more uncommitted writes to a given memory address and a byte valid indicator for indicating which bytes of the data associated with the given memory address are valid.

15. The method of claim 12, wherein updating the UGQ entry associated with the first memory address to contain the first data, comprises updating an existing UGQ entry associated with the first memory address or allocating a new UGQ entry and associating the new UGQ entry with the first memory address.

16. The method of claim 12, wherein creating or updating the UGQ entry associated with the first memory address to contain the first data comprises:
determining whether the UGQ contains a UGQ entry associated with the first memory address;
upon a determination that the UGQ does not contain a UGQ entry associated with the first memory address, creating a UGQ entry associated with the first memory address, storing the first data in the UGQ entry, and setting a byte valid indicator of the UGQ entry to indicate which bytes of data in the UGQ entry are valid; and
upon a determination that the UGQ contains a UGQ entry associated with the first memory address, updating the UGQ entry associated with the first memory address to include the first data, and updating the byte valid indicator of the UGQ entry to indicate which bytes of the data in the UGQ entry are valid.

17. The method of claim 16, wherein updating the UGQ entry associated with the first memory address to include the first data comprises overwriting portions of the data currently stored in the UGQ entry with corresponding portions of the first data that are valid and not overwriting portions of the data currently stored in the UGQ entry that correspond to portions of the first data that are not valid.

18. The method of claim 12, further comprising:
sending data from the UGQ entry associated with the second memory address to the processor upon a determination that the UGQ contains a UGQ entry associated with the second memory address.

19. The method of claim 18, further comprising:
forwarding the read instruction to a memory cache or to a main memory upon a determination that the UGQ does not contain a UGQ entry associated with the second memory address.

20. The method of claim 12, further comprising:
receiving, from a processor, a read instruction for reading from the third memory address; and
sending, to the processor, the data from the UGQ entry associated with the third memory address.

21. The method of claim 12, further comprising:
determining that a cache invalidate signal applies to a fourth UGQ entry; and
updating a byte valid indicator of the fourth UGQ entry to mark as invalid any affected bytes that do not have an in-flight write in the IOQ.

22. The method of claim 12, further comprising:
determining that a flush signal applies to a fifth IOQ entry associated with a fifth memory address;
determining that a fifth UGQ entry is associated with the fifth memory address;
invalidating the fifth IOQ entry; and
rebuilding the fifth UGQ entry based on any IOQ entries that are associated with the fifth memory address and that are still valid.

* * * * *